United States Patent
Vicory et al.

(10) Patent No.: US 7,688,961 B2
(45) Date of Patent: Mar. 30, 2010

(54) EFFICIENT MULTIPLEX CONFERENCING ENGINE

(75) Inventors: Jay Vicory, Waltham, MA (US); Malcolm Strandberg, Cambridge, MA (US); Thomas Ward, Marathon, FL (US)

(73) Assignee: Concerto Software, Inc, Chelmsford, MA (US)

(*) Notice: Subject to any disclaimer, the term of this patent is extended or adjusted under 35 U.S.C. 154(b) by 1500 days.

(21) Appl. No.: 10/948,951

(22) Filed: Sep. 24, 2004

(65) Prior Publication Data

US 2005/0091444 A1 Apr. 28, 2005

Related U.S. Application Data

(60) Provisional application No. 60/506,308, filed on Sep. 26, 2003.

(51) Int. Cl.
*H04M 3/42* (2006.01)
*H04L 12/16* (2006.01)

(52) U.S. Cl. ............................. 379/202.01; 379/203.01; 379/204.01; 370/260; 370/263; 370/266; 370/267

(58) Field of Classification Search .................. 370/260, 370/263, 266, 267; 379/202.01, 203.01, 379/204.01
See application file for complete search history.

(56) References Cited

U.S. PATENT DOCUMENTS

| 5,555,179 | A | | 9/1996 | Koyama ........................ 700/95 |
| 5,765,033 | A | | 6/1998 | Miloslavsky ................. 709/206 |
| 5,841,763 | A | * | 11/1998 | Leondires et al. ............ 370/260 |
| 5,926,539 | A | | 7/1999 | Shtivelman ............. 379/266.01 |
| 5,946,387 | A | | 8/1999 | Miloslavsky ............ 379/265.12 |
| 5,953,332 | A | | 9/1999 | Miloslavsky ................. 370/352 |
| 5,953,405 | A | | 9/1999 | Miloslavsky ............ 379/265.01 |
| 6,002,760 | A | | 12/1999 | Gisby ..................... 379/266.01 |
| 6,021,428 | A | | 2/2000 | Miloslavsky ................. 709/206 |
| 6,044,145 | A | | 3/2000 | Kelly et al. ............ 379/265.02 |
| 6,044,368 | A | | 3/2000 | Powers ........................... 707/2 |
| 6,067,357 | A | | 5/2000 | Kishinky et al. ........ 379/265.02 |
| 6,108,711 | A | | 8/2000 | Beck et al. ................... 709/242 |
| 6,138,139 | A | | 10/2000 | Beck et al. ................... 709/202 |
| 6,167,395 | A | | 12/2000 | Beck et al. ...................... 707/3 |
| 6,170,011 | B1 | | 1/2001 | Macleod Beck et al. ..... 709/224 |
| 6,175,563 | B1 | | 1/2001 | Miloslavsky ................. 370/352 |
| 6,175,564 | B1 | | 1/2001 | Miloslavsky et al. ........ 370/352 |
| 6,185,292 | B1 | | 2/2001 | Miloslavsky ............ 379/265.01 |
| 6,345,305 | B1 | | 2/2002 | Beck et al. ................... 709/242 |

(Continued)

*Primary Examiner*—Ahmad F Matar
*Assistant Examiner*—Nafiz E Hoque
(74) *Attorney, Agent, or Firm*—Bourque and Associates, PA

(57) ABSTRACT

A conference engine operates in a multiplex processing scheme and requires a signal hardware summer to process all of the programmed conferences, all of the outputs and all of the input channels. The conference engine is only limited by the number of available input channels, the number of desired conference registers, the speed of the implementation, and the amount of memory available on the target system. The conference engine allows the number of available conference channels, the number of conferences per bridge and the number of bridges to be scaled. Each bridge contains a unique set of conference registers and has full access to the input channel data. Additional conference bridges are added by increasing the operating clock/memory to meet the processing requirements of the additional bridge. Conference registers in each conference bridge can be added/removed depending on the system requirements and are independent of the number of input channels.

5 Claims, 10 Drawing Sheets

U.S. PATENT DOCUMENTS

| | | | |
|---|---|---|---|
| 6,373,836 B1 | 4/2002 | Deryugin et al. | 370/352 |
| 6,389,007 B1 | 5/2002 | Shenkman et al. | 370/352 |
| 6,393,015 B1 | 5/2002 | Shtivelman | 370/352 |
| 6,732,156 B2 | 5/2004 | Miloslavsky | 709/206 |
| 6,792,092 B1 * | 9/2004 | Michalewicz | 379/202.01 |
| 6,831,971 B2 * | 12/2004 | Wellner et al. | 379/202.01 |
| 2001/0002927 A1 * | 6/2001 | Detampel et al. | 379/202 |

\* cited by examiner

FIG. 4

| Switch | Timeslot | Bridge 0 Conf. | Bridge 1 Conf. | Bridge 2 Conf. | Bridge 3 Conf. | Output Data | Output Conf. | Switch |
|---|---|---|---|---|---|---|---|---|
| 4 | 4 | | | | | | | x |
| 5 | 5 | 2 | 5 | | | 6+7 | 0 | 5 |
| 6 | 6 | 2 | 5 | | | 5+7 | 0 | 6 |
| 7 | 7 | 2 | 5 | | | 5+6 | 0 | 7 |
| 8 | 8 | 1,5 | 5 | | | 4+5+6+7 | 1 | 8 |
| 4 | 9 | 1,5 | | | | 4+5+6+8 | 1 | 4 |
| | 10 | | | | | | | |

FIG. 5

| Switch | Timeslot | Bridge Conf. 0 | Bridge Conf. 1 | Bridge Conf. 2 | Bridge Conf. 3 | Output Data | Output | Switch |
|---|---|---|---|---|---|---|---|---|
| 4 | 4 | 2 | | | | 5+6 | 0 | 4 |
| 5 | 5 | 2 | | | | 4+6 | 0 | 5 |
| 6 | 6 | 2 | | | | 4+5 | 0 | 6 |
| | 7 | | | | | | | |
| | 8 | | | | | | | |
| | 9 | | | | | | | |
| | 10 | | | | | | | |

FIG. 6

| Switch (48) | Timeslot (46) | Bridge 0 Conf. (44) | Bridge 1 Conf. | Bridge 2 Conf. | Bridge 3 Conf. | Output Data (47) | Output (49) | Switch |
|---|---|---|---|---|---|---|---|---|
| 4 | 4 | 2 | | | | 5+6+7 | 0 | 4 |
| 5 | 5 | 2 | | | | 4+6+7 | 0 | 5 |
| 6 | 6 | 2 | | | | 4+5+7 | 0 | 6 |
| 7 | 7 | 2 | | | | 4+5+6 | 0 | 7 |
| | 8 | | | | | | | |
| | 9 | | | | | | | |
| | 10 | | | | | | | |

| Switch | Timeslot | Bridge 0 Conf. | Bridge 1 Conf. | Bridge 2 Conf. | Bridge 3 Conf. | Output Data | Output | Switch |
|---|---|---|---|---|---|---|---|---|
| 4 | 4 | 2 | 5 | | | 5+6+7 | 0 | 4 |
| 5 | 5 | 2 | 5 | | | 4+6+7 | 0 | 5 |
| 6 | 6 | 2 | 5 | | | 4+5+7 | 0 | 6 |
| 7 | 7 | 2 | 5 | | | 4+5+6+7 | 1 | 7 |
| 8 | 8 | 1,5 | 5 | | | 4+5+6+7 | 1 | 8 |
| | 9 | | | | | | | |
| | 10 | | | | | | | |

| Switch | Timeslot | Bridge 0 Conf. | Bridge 1 Conf. | Bridge 2 Conf. | Bridge 3 Conf. | Output Data | Output | Switch |
|---|---|---|---|---|---|---|---|---|
| 4 | 4 | 1,5 | 5 | 2 | | 5+6+7+8 | 1 | 4 |
| 5 | 5 | 2,2 | 5 | 2 | | 4+6+7 | 2 | 5 |
| 6 | 6 | 2,2 | 5 | 2 | | 4+5+7 | 2 | 6 |
| 7 | 7 | 2,2 | 5 | 2 | | 4+5+6 | 2 | 7 |
| 8 | 8 | 1,5 | 5 | | | 4+5+6+7 | 1 | 8 |
| | 9 | | | | | | | |
| | 10 | | | | | | | |

FIG. 8

| Switch | Timeslot | Bridge 0 Conf. | Bridge 1 Conf. | Bridge 2 Conf. | Bridge 3 Conf. | Output Data | Output | Switch |
|---|---|---|---|---|---|---|---|---|
| 4 | 4 | 1,5 | 5 | | | 5+6+7+8 | 1 | 4 |
| 5 | 5 | 2,2 | 5 | 2 | | 6+7 | 2 | 5 |
| 6 | 6 | 2,2 | 5 | 2 | | 5+7 | 2 | 6 |
| 7 | 7 | 2,2 | 5 | 2 | | 5+6 | 2 | 7 |
| 8 | 8 | 1,5 | 5 | | | 4+5+6+7 | 1 | 8 |
| | 9 | | | | | | | |
| | 10 | | | | | | | |

| Switch | Timeslot | Bridge 0 Conf. | Bridge 1 Conf. | Bridge 2 Conf. | Bridge 3 Conf. | Output Data | Output | Switch |
|---|---|---|---|---|---|---|---|---|
| 4 | 4 | 1,5 | 5 | 5 | 2 | 5+6+7+8 | 1 | 4 |
| 5 | 5 | 3,2 | 5 | 5 | 2 | 4+6+7 | 3 | 5 |
| 6 | 6 | 3,2 | 5 | 5 | 2 | 4+5+7 | 3 | 6 |
| 7 | 7 | 3,2 | 5 | 5 | 2 | 4+5+6 | 3 | 7 |
| 8 | 8 | 1,5 | 5 | 5 | | 4+5+6+7 | 1 | 8 |
| | 9 | | | | | | | |
| 10 | 10 | 2,5 | | 5 | | 4+5+6+7+8 | 2 | 10 |

EFFICIENT MULTIPLEX CONFERENCING ENGINE

CROSS-REFERENCE TO RELATED APPLICATIONS

This application claims the benefit of U.S. Provisional Application No. 60/506,308, filed Sep. 26, 2003 and which is fully incorporated herein by reference.

TECHNICAL FIELD

The present invention relates to the fields of communication systems and conferencing and more particularly, relates to methods and apparatus for reducing the bandwidth required to conduct a multipoint conference.

BACKGROUND INFORMATION

Conference calls are a well-known and useful tool. Conference calls allow a plurality of people or equipment (hereinafter referred to collectively as resources) to exchange and receive data from one or more of the other resources simultaneously.

A common use of conference calls includes a traditional three-way telephone call. A traditional three-way telephone call allows three or more people who might be spread out over a large geographic area, to simultaneously hear and talk to each other. The use of conference calls has become increasingly more popular (especially when combined with video conferencing and the like) as it is a significantly easier and cheaper alternative to scheduling traditional person-to-person meetings.

Accordingly, what is needed is a method and apparatus for establishing conferences, and in particular complex conferences, which uses the same model and which reduces the amount of equipment necessary. The method and apparatus should preferably be a scalable, multichannel conference system utilizing a multiplexed processing scheme. Cost should preferably be minimized by employing only an efficient single-adder implementation. The method and apparatus should preferably allow any-to-any conferencing across all input channels and all output channels and should preferably allow passthrough channels to any output channel. Also, the method and apparatus should preferably allow low processing latency generally limited to a single frame.

Other examples of conference calls include contact centers. According to this example, a customer can communicate with two or more agents at a contact center simultaneously. The ability to conference greatly increases the experience of the customer since it allows the customer access to more than one agent who may have expertise in different areas. Another example is a monitoring, coaching, or supervisor situation where one party can hear all the parties but can only talk to or be heard by one other party (typically the agent).

While the use of conferences has greatly facilitated the ease of communicating with a plurality of people and greatly minimized travel and other expenses associated with communication over long distances, current methods and apparatus for creating conferences suffer from several disadvantages. One disadvantage of the current practice is that it is equipment extensive. Another problem is that conferencing set-up becomes increasingly complex as the number of parties increases and the relationships between the parties becomes more complex (e.g., party A can hear all parties but only talk to and be heard by party B, while party C can only hear party B, but party B can hear both parties A and C). Current conference methods require a great deal of equipment resources in order to create the more complex conferences. One current method uses special config bits (i.e., special attributes) in an attempt to create and define complex conferences. Other methods use two or more additional conferences where the output of one conference is duplicated into a second or subsequent conference using external switches. Current methods only associate a single timeslot with a single bridge.

Accordingly, what is needed is a method and apparatus for establishing conferences, and in particular complex conferences, which uses the same model and which reduces the amount of equipment necessary. The method and apparatus should preferably be a scalable, mult-channel conference system utilizing a multiplexed processing scheme. Cost should preferably be minimized by employing only an efficient single-adder implementation. The method and apparatus should preferably allow any-to-any conferencing across all input channels and all output channels and should preferably allow pass-through channels to any output channel. Also, the method and apparatus should preferably allow low processing latency generally limited to a single frame.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

A conference engine operates in a multiplex processing scheme and requires a signal hardware summer to process all of the programmed conferences, all of the outputs and all of the input channels. The conference engine is only limited by the number of available input channels, the number of desired conference registers, the speed of the implementation, and the amount of memory available on the target system.

The conference engine allows the number of available conference channels, the number of conferences per bridge and the number of bridges to be scaled. Each bridge contains a unique set of conference registers and has full access to the input channel data. Additional conference bridges are added by increasing the operating clock/memory to meet the processing requirements of the additional bridge. Conference registers in each conference bridge can be added/removed depending on the system requirements and are independent of the number of input channels.

BRIEF DESCRIPTION OF THE DRAWINGS

These and other features and advantages of the present invention will be better understood by reading the following detailed description, taken together with the drawings wherein:

FIG. 4 is a example of one possible conference engine table according to the present invention;

FIG. 5 is an example of one embodiment of a conference engine table for a three-party conference;

FIG. 6 is an example of one embodiment of a conference engine table for a four-party conference;

FIG. 7 is an example of one embodiment of a conference engine table for a four-party conference with a monitor;

FIG. 8 is an example of one embodiment of a conference engine table for a four-party conference with a coach;

FIG. 9 is an example of one embodiment of a conference engine table for a four-party conference with a coach in private; and FIG. 10 is an example of one embodiment of a conference engine table for a four-party conference with a coach and a supervisor.

DETAILED DESCRIPTION OF THE PREFERRED EMBODIMENTS

Figure 1:
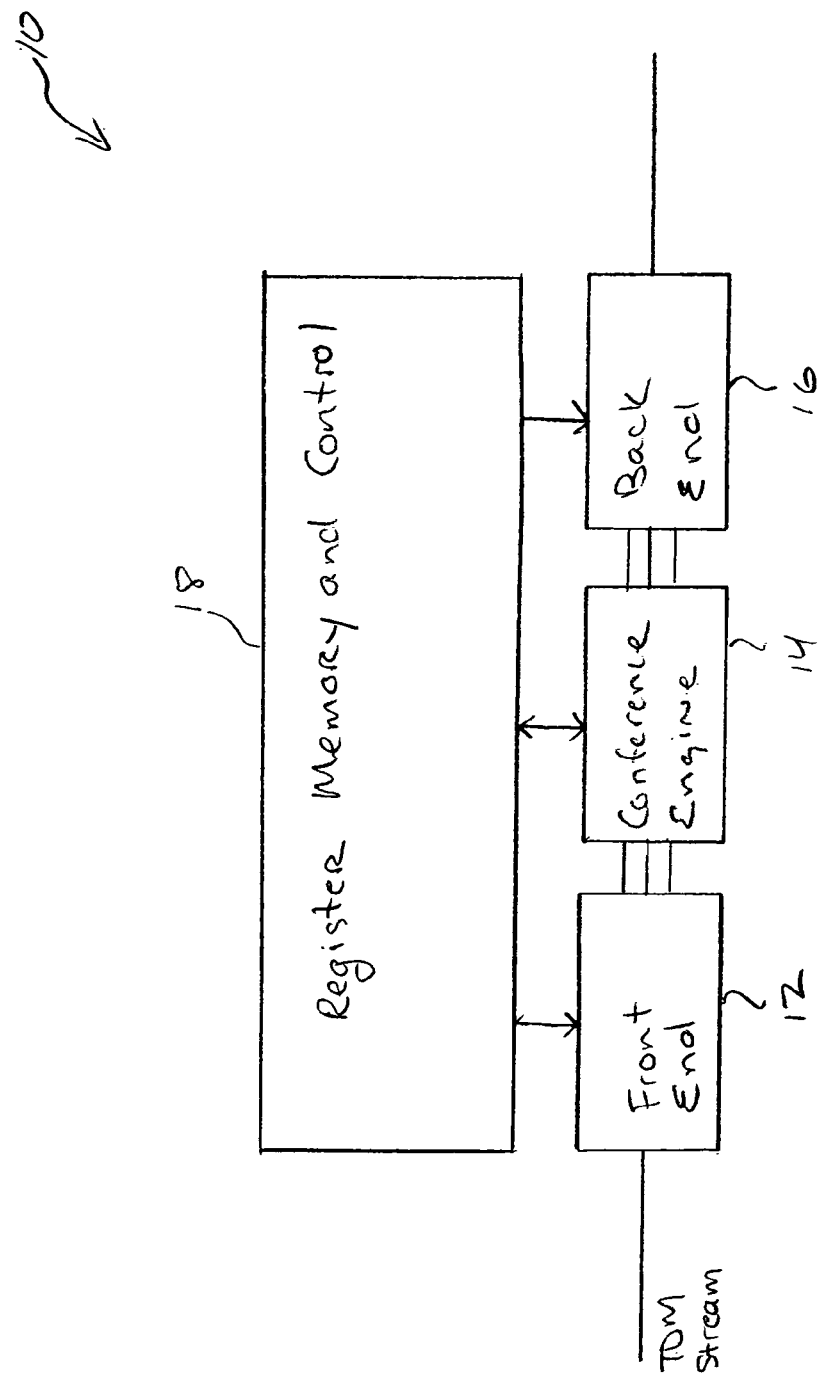
FIG. 1 is a block diagram of one embodiment of the conference engine system according to the present invention.

An efficient multiplex conferencing engine 10, FIG. 1, provides flexible multi-channel conferencing between a plurality of resources in an efficient architecture suitable for programming devices and ASICs. As will be explained in great detail hereinbelow, the conference engine 10 can be scaled to provide for system growth and is only limited by the number of available input channels, the number of desired conference registers, the speed of the implementation, and the amount of memory available on the target system. The conference engine 10 allows the number of available conference channels, the number of conferences per bridge and the number of bridges to be scaled.

The conference engine 10 allows for conference bridge scalability. Each bridge contains a unique set of conference registers and each bridge has full access to the input channel data. Additional conference bridges can be added to the conference engine 10 by simply increasing the operating clock and memory to meet the processing requirements of the additional bridge.

The conference engine 10 can be scaled to the number of available input channels. For instance, if the target system is utilizing input data consisting of 128 channels and it is desired to increase the capacity to 256 channels, the operating clock and memory would simply be increased to meet the new capacity requirement.

The conference engine 10 can be scaled to desired number of conference registers. The conference registers in each conference bridge can be added or removed depending on the target system requirements and are independent of the number of input channels.

The conference engine 10 makes no assumptions about the type of conference(s) the user wishes to develop by providing the ability to define the conference members in its entirety. A conference programmed by the user in the conference engine 10 can include a single-member channel or it may include many conference members. Additionally, conference attributes can be attached on an individual conference basis or to individual conference channels. Due to its architecture, the conferencing engine 10 provides the ability to conference any of the input channels with any other input channel, the ability to output any of the available conferences on to any of the output channels, and is designed to process all of the conferences within a single frame timespan.

According to one embodiment, the conferencing engine 10 may be utilized in a system containing individual blocks consisting of a front-end pipeline processor 12, a conference engine 14, a back-end pipeline processor 16, and register/memory GLU logic 18. The front-end pipeline processor 12 provides linear encoded data to the conference engine 14 and the back-end pipeline processor 16 receives linear encoded conference data. The register memory and control 18 consist of memory registers utilized by the conference engine 14 and programmed by the system user.

Figure 2:
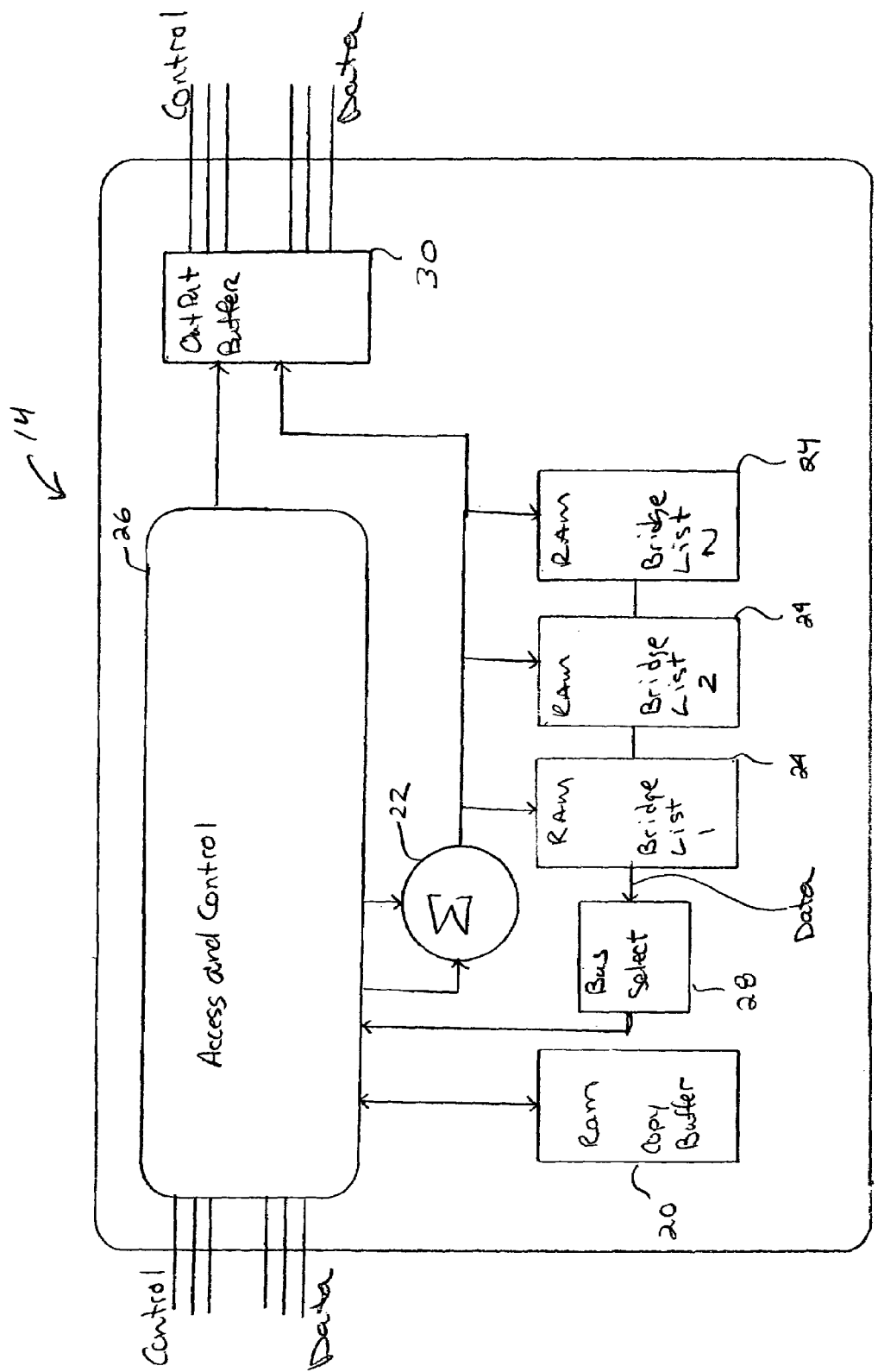
FIG. 2 is a block diagram of one embodiment of the conference engine shown in FIG. 1 according to one embodiment of the present invention.

Referring specifically to FIG. 2, the conference engine 14 is shown in greater detail. The conference engine 14 provides N individual bridge subsections and a scalable number of individual conference groups per bridge. Each conference group can contain any number of conference parties (up to the number of individual conference groups) and can include any party from input channels. Over the entire set of conference bridges (assuming tour bridges, 128 input channels and 128 conference groups) and conference registers, the conference engine block 14 performs approximately five million 16-bit signed summation operations per second and transfers approximately 90 Megabytes of data per second. The output buffer is updated once per frame synchronization.

The copy buffer 20 is preferably a RAM containing a local copy of the input channel data that is refreshed once per frame synchronization signal. The input data contains the data to be utilized by the conference engine 14. The input data also contains channel control data that is alternately passed to the output channel.

The summer 22 is preferably a single signed adder. Typically, hardware implementations of signed adders are expensive in terms of size and overall system costs. Utilizing a single adder by multiplexing summation operations and storing intermediate results reduces the overall system costs.

One or more bridges 24 (preferably two ported RAM) are connected to the output from the summer 22 and to the access and control subsection 26. The access and control subsection 26 performs the multiplex conference operations as will be explained in great detail herein below. The access and control substation 26 has bus connections to the copy buffer 20 the bridges 24, the summer 22, the output buffer 30, and to an external bus for control data. The external bus provides access to conference control data that is programmed as will be explained in great detail herein below. The output buffer 30 is preferably a dual ported RAM containing the process output channel data. The output buffer 30 is updated once per frame synchronization signal.

As discussed above, the access and control subsection 26 performs the multiplex conference operations and provide scalability and efficiency. The conference engine 14 only requires a single hardware summer 22 to process all of the programmed conferences, all of the output and all of the input channels.

Figure 3:
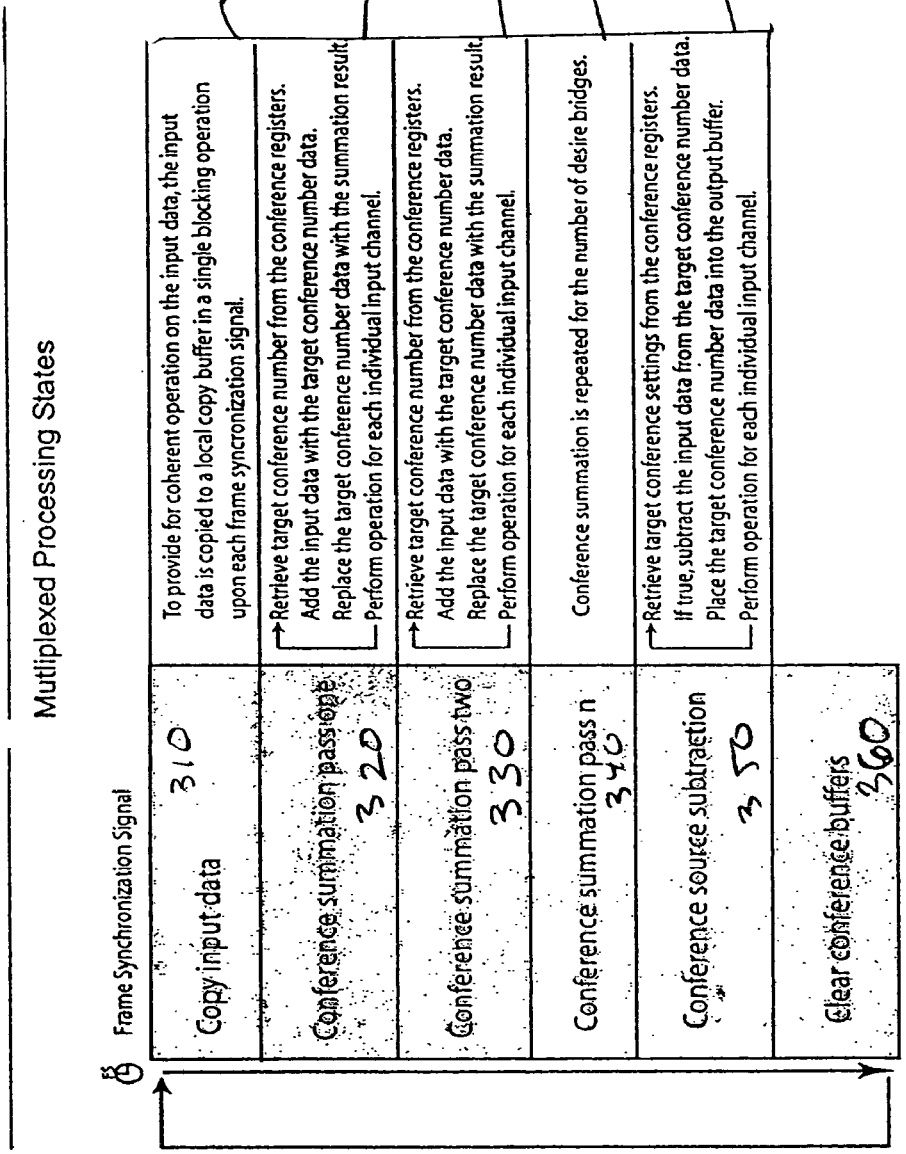
FIG. 3 is flow chart of one embodiment of the multiplex processing states performed by the access and control subsection shown in FIG. 2.

Referring specifically to FIG. 3, the multiplex processing states are shown in greater detail. In act 310, the input data is copied. In order to provide for coherent operation on the input data, the input data is copied to a local copy buffer 20 (FIG. 2) in a single blocking operation upon each frame synchronization signal. At act 320, the first conference summation pass is performed. The target conference number is retrieved from the conference registers and the input data is added. The target conference number data is replaced with the summation result. This operation is performed for each individual input channel.

At act 330, the second conference summation pass is performed. This processing state is substantially the same as the first conference summation pass and is generally repeated for N number of desired conference bridges (act 340).

At act 350, the target conference settings are retrieved from the conference registers. If desired, the input data is subtracted from the target conference number data. The target conference number data is placed into the output buffer 30 (FIG. 2). This operation is performed for each individual input channel. At act 360, the conference buffers are cleared. The acts are repeated as necessary.

As discussed above, the conference control registers control the output timeslot data and conference selection. Each timeslot (channel) preferably has an associated register.

| 31 | 15 | 9  8 | 7 6 5 | 4 3 2 1 0 |
|---|---|---|---|---|
| Reserved | Threshold (TBD) | Bridge Select* | Subtract | Conference Selection (1-126) |
|  | RW, 000000 | RW, 00 | RW, 0 | RW, (Pass Through Timeslot) |

*Bridge Select and Subract bits are only valid within the context of the first bridge control registers.

The Conference Selection [6:0] selects which conference to add the particular timeslot. Default state contains the associated timeslot number for the particular memory mapped register (pass-through). The setting the Subtract [7:7] bit active low (0) subtracts the source input timeslot data from the conference upon output. Threshold [15:10] is not implemented. The Bridge Select [9:8] determines which bridge contains the output timeslot data. Put another way, the bridge select determines which bridge contains the conference data to be output on that particular register's timeslot. The bridge assignment is as follows:

| Bridge Selection Bit Field | |
|---|---|
| Bits <9:8> | Bridge Number |
| 2'b00 | Bridge 0 |
| 2'b01 | Bridge 1 |
| 2'b10 | Bridge 2 |
| 2'b11 | Bridge 3 |

The conference control registers are memory mapped to have an association with the input timeslots. There are four discrete sets of 126 registers over four bridges. The following example details the memory mapping for a single bridge.

| Base + 0x00 | Base + 0x04 | Base + 0x08 | | |
|---|---|---|---|---|
|  | Control 1 | ... | | |
|  | ... | Control 125 | Control 126 |

Bridge0_Ptr=Base_Ptr+0x0800+(Timeslot_Number+1) *4; where timeselot is any number in the range 1-126.

Bridge1_Ptr=Base_Ptr+0x1800+(Timeslot_Numboer+1) *4; where timeselot is any number in the range 1-126.

Bridge2_Ptr=Base_Ptr+0x1800+(Timeslot_Numboer+1) *4; where timeselot is any number in the range 1-126.

Bridge3_Ptr=Base_Ptr+0x2000+(Timeslot_Numboer+1) *4; where timeselot is any number in the range 1-126.

While specific embodiments of, and examples for, the invention are described herein for illustrative purposes, various equivalent modifications are possible within the scope of the invention, as those skilled in the relevant art will recognize. Other conference combinations, situations, and embodiments are also within the scope of the present invention, which should not be limited to the following illustrative embodiments except where specifically and expressly stated in the claims.

These examples assume that the front-end and back-end conferences have been set-up to the desired pre-processing/companding and are not detailed in these examples.

Conferences are created and destroyed by setting the conference control registers to the appropriate values for the intended end-conference effect. The conference control registers, used in the following examples, are a series of duplicate registers across 126 possible conferences per bridge. In the following examples, there are four independent bridges each containing 126 conference control registers for a total of 504 possible control settings.

The first bridge is unique in that it defines the output timeslot depending on which register is programmed. The first bridge can also perform a subtraction using the input timeslot data. By default, and under most circumstances, subtraction of the source timeslot is performed on the desired output timeslot data. The second, third, fourth and subsequent conference bridges operate the same as the first bridge but they do not explicitly define the output timeslot and they do not perform any subtraction of the source data.

The switch column 32, FIG. 4, represents the input switch setting of the digital switch. For example, in the first row the switch 32 is set to attach the source data onto timeslot four of the conference highway/stream. The timeslot column 34 represents the physical timeslot of the conference highway/stream. For example, in the first row, the timeslot is timeslot number four.

The bridge columns 36 represent the conference bridges and the assigned bridge conferences. For example, in the second row, the input data has been assigned to conference number two (conference list two) and conference number five (conference list one). The output timeslot data is always the value in the first bridge and is set to output the result of conference number two (in this example). In the fifth row, the input data has been assigned into conference number five on the second bridge. The output timeslot data is always the value in the first bridge and is set to output the result of conference number five on the second bridge.

The output column 38 represents the mathematical result produced by the conference engine. For example, in the second row, the resultant output data is the sum of the input timeslot data on timeslots six and seven. Under most circumstances, subtraction of the source timeslot is performed on the desired output timeslot data. Output conference column 40 represents an alternative representation of the output shown in output column 38 given in terms of which bridge conference number. For example, in the second row, the output includes those timeslots which are part of the bridge conference number zero.

Lastly, switch column 42 represents the output switch setting for the source data. For example, in the second row, the switch is set to source data from timeslot five of the conference highway/stream. The value "X" is a "don't care" setting.

Referring now to FIG. 5, one embodiment of a three party conference 43 is shown. A three-party conference is created by first setting the digital switch output connection to point to the conference engine. Next, the conference number in the first bridge is set and then the digital switch is set to source the output data from the conference engine.

In the present example, the conference number 44 used in this example is two and timeslots 46 four, five, and six are used. However, the conference number 44 and the timeslots 46 to include in the conference is an arbitrary value in the range of 0-128. The conference number 44 is completely independent of the timeslots 46. But, the input timeslot data is dependent on the conference control registers memory mapping and the digital switch connection settings 48. The output data is dependent on the conference control register memory mapping and the value programmed into that register.

The output data 47 (i.e., what the user hears) for timeslot four includes the sum of timeslots five and six. As mentioned previously, the source timeslot (i.e., four) is subtracted. Alternatively, this can be represented by saying that the output 49 for timeslot four is conference bridge zero. This alternative expression simply means that the user will hear all timeslots associated with conference bridge zero.

FIG. 6 represents one embodiment of a four-party conference 50. A four-party conference 50 is created by simply adding another timeslot 46 to the conference 44. Additional conference members can continue to be added up to 126 members. However, clipping and background noise may become an issue above a certain number of members since thresholding is not performed at this point.

In this example, the output data 47 for timeslot four includes the sum of timeslots five, six, and seven (again, the source timeslot is subtracted). Alternatively, this can be represented by saying that the output 49 for timeslot four is conference bridge zero.

FIG. 7 represents one embodiment of a four-party conference with a monitor 60. A monitor 62 (represented by timeslot eight) can be added by utilizing a conference bridge (in this case conference bridge one). Since all timeslots are associated with conference bridge one, the monitor 62 hears the sum of timeslots four, five, six, and seven. However, since timeslots four, five, and six are only associated with bridge conference zero, they cannot hear the monitor 62.

FIG. 8 represents one embodiment of a four-party conference with a coach 70. In this case, two output timeslots utilize the second bridge 72. The "Coach" 74 (who has been assigned to timeslot eight) and the "Agent" 76 (who has been assigned to timeslot four) both hear and can talk to each other. Both "Agent" 76 and "Coach" 74 can hear all of the parties in the conference as indicated by the output data 47. However, the other conference members cannot hear the "Coach" 74 while the other members can hear the "Agent" 76.

FIG. 9 represents one embodiment of a four-party conference with a coach in private 80 based on the configuration shown in FIG. 8. In this example, the conversation between the "Coach" 82 (timeslot eight) and the "Agent" 84 (timeslot four) is private and cannot be heard by the other members of the conference.

In this case, the "Agent" 84 is temporarily dropped from the conference on the first bridge 86, but can still hear the conference as can the "Coach" 82. The "Agent" 84 has muted his conversation with the first conference on the first bridge 86 while conversing with the "Coach" 82 on the second bridge 88. The "Agent" 84 can later be "un-muted" from the conference on the first bridge 86 by simply adding the "Agent" 84 back into the first bridge 86.

FIG. 10 represents a four-party conference with a coach and a supervisor 90. The supervisor 92 (timeslot ten) can hear all parties including the "Agent" 94 (timeslot four) and the "Coach" 96 (timeslot eight).

Accordingly, the present invention includes an apparatus and method for establishing conferences, and in particular complex conferences, which uses the same model and which reduces the amount of equipment necessary. The method and apparatus includes a scalable, multichannel conference system utilizing a multiplexed processing scheme and minimizes cost by employing only an efficient single-adder implementation. The method and apparatus allow any-to-any conferencing across all input channels and all output channels and allows pass-through channels to any output channel. Additionally, the method and apparatus allow low processing latency generally limited to a single frame.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A conference engine comprising:
a copy buffer including a local copy of input channel data that is refreshed once per frame synchronization signal, said input data containing data to be utilized by said conference engine and containing channel control data that is ultimately passed to an output channel;
a summer, said summer including a single signed adder;
a plurality of bridges connected to an output of said summer;
an output buffer, said output buffer including processed output channel data updated once per frame synchronization signal; and
an access and control subsection, said access and control subsection to perform multiplexed conference operations and including connections to said copy buffer, said plurality of bridges, said summer, said output buffer, and to an external bus for conference control data.

2. The conference engine as claimed in claim 1 further including:
a front-end pipeline processor, said front-end pipeline processor providing linear encoded data to said conference engine;
a back-end pipeline processor; and
a register/memory GLU logic having memory registers utilized by said conference engine and programmed by a system user.

3. The conference engine as claimed in claim 1 wherein said copy buffer includes random access memory.

4. The conference engine as claimed in claim 1 wherein said plurality of bridges include dual ported random access memory.

5. The conference engine as claimed in claim 1 wherein said output buffer includes dual ported random access memory.

* * * * *